May 23, 1961     B. C. MADDEN, JR     2,985,411
STRUCTURAL ELEMENT HAVING SPHERICAL-LIKE FILLING
Filed June 25, 1957
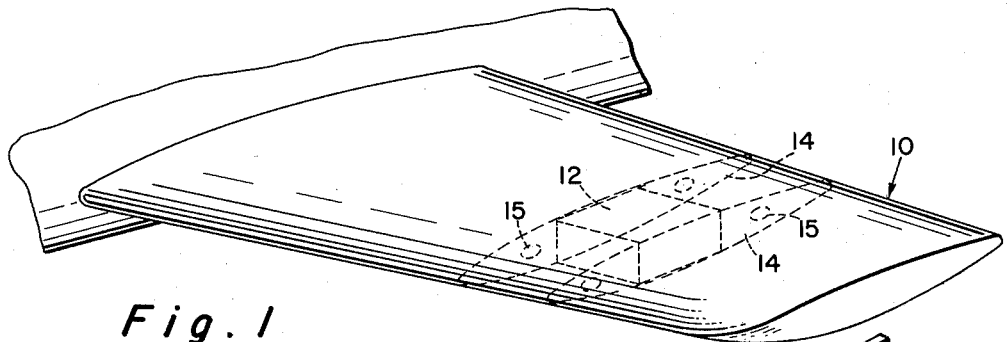
Fig. 1
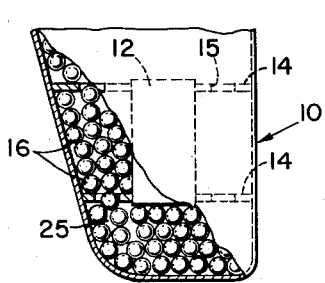
Fig. 3
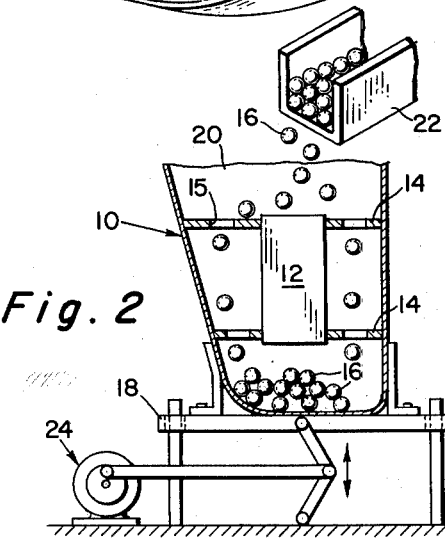
Fig. 2
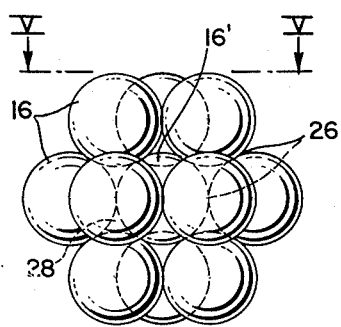
Fig. 4
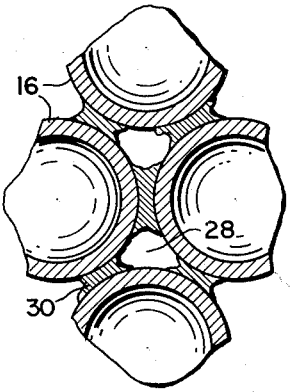
Fig. 5
Fig. 6
INVENTOR.
BAXTER C. MADDEN JR.
BY
ATTORNEYS

United States Patent Office 2,985,411
Patented May 23, 1961

2,985,411
STRUCTURAL ELEMENT HAVING SPHERICAL-LIKE FILLING
Baxter C. Madden, Jr., 680 N. Loop Drive, Camarillo, Calif.
Filed June 25, 1957, Ser. No. 668,001
6 Claims. (Cl. 244—123)
(Granted under Title 35 U.S. Code (1952), sec. 266)

The invention described herein may be manufactured and used by or for the Government of the United States of American for governmental purposes without the payment of any royalties thereon or therefor.

This invention relates to structural elements and more particularly to a hollow interstitial structural element and a method of fabricating such an element by filling with a plurality of integrally connected spheres forming a rigid interstitial mass capable of being internally cooled.

Supersonic aircraft require structural elements that are able to withstand substantially higher temperatures than subjected to such elements in subsonic aircraft. In some instances it is desirable to cool said structure wherein provisions must be made for coolant passageways in the internal structure. In addition to the above requirements, it is desirable that the structural element be as low weight as is consistent with high stress performance to which the aircraft is subjected. Finally, such a structural element must be low cost, which as a matter of necessity implies a simple and inexpensive manufacturing process. It should be understood that while this invention is generated around the requirements of structural elements for operation of high speed aircraft at elevated temperatures, it is not limited to aircraft structures or use at high temperatures.

Spherical bodies have been employed in aircraft structure, i.e., wings, as shown in U.S. Patent No. 2,602,614 issued July 8, 1952. This patent teaches the construction of a wing structure in which is aligned a single row of spherical members of graduated diameters conforming to the wing cavity. The hollow spherical bodies are interconnected by tubular couplings for containing an aircraft fuel, a hydraulic fluid or a fire extinguisher liquid. The single row of spheres is secured together by channel strips or by welding.

A principal drawback of the patented construction resides in the inherently high cost involved in hand arranging and fabricating the spheres on an individual basis. Furthermore, the number and diameter of the graduated spheres will depend on the cross sectional configuration of the wing, requiring a tailored construction.

According to the present invention a hollow structural element is reinforced by a plurality of uniformly arranged, identical spherical-like bodies rigidly connected together and to the walls of the structural element to provide a rigid mass having interstitial passages therethrough capable of passing a fluid flow. In carrying out the method of fabrication, the uniformly sized spherical bodies are dumped into the structural element and randomly disposed. The structural element is then vibrated by any conventional manner causing the spherical bodies to assume a uniform arrangement therein, each sphere generally having uniformly spaced points of contact around its periphery with adjacent spherical bodies, and in contact with the inner wall of the structural element. The structural element and filling of spherical bodies is then formed into a rigid integral interstitial mass by fusing the components together at their various points of contact. This result may be accomplished in a single operation, preferably by coating the spherical surfaces of the bodies with a suitable bonding agent which will fuse upon the application of heat.

A principal object of this invention is to provide a structural element that has a uniform filling of identical spherical bodies integrally joined in an interstitial mass.

Another object of this invention is to provide a simple and inexpensive method for fabricating such a structural element.

Other objects and many of the attendant advantages of this invention will be readily appreciated as the same becomes better understood by reference to the following detailed description when considered in connection with the accompanying drawings wherein:

Fig. 1 is a perspective view of an aircraft wing being a typical example of a structural element on which the invention may be practiced;

Fig. 2 is a reduced partial longitudinal section of the wing of Fig. 1 with the skin removed illustrating diagrammatically the steps in the fabrication process of random filling and vibrating the structural element;

Fig. 3 is a similar partial longitudinal section of the element in Fig. 2 after the vibration step showing an optimum arrangement of the spherical bodies;

Fig. 4 is an enlarged portion in elevation of the spherical body filling of Fig. 3 showing the optimum orientation of the spherical bodies;

Fig. 5 is a top plan view of Fig. 4 taken along line V—V with some of the spherical bodies in section to show an outer fusible coating prior to the fusing step in the process; and Fig. 6 is an enlarged view of the sectioned area in Fig. 5 after the fusing step showing the spherical bodies integrally joined by the fusible coating.

Referring to the drawing where like reference numerals refer to similar parts, there is shown in Fig. 1 a wing 10 of an aircraft which is only one example of a structural element capable of being fabricated by the instant invention. Wing 10 is of a hollow construction in which a fuel tank 12 or the like can be suitably supported therein by stringers 14.

The initial step in the fabricating process resides in filling the hollow wing with a supply of identical spherical bodies 16, hereinafter described in greater detail. As shown in Fig. 2, filling can best be accomplished in the case of wing 10 by supporting it in a position on a stand 18 with an open end 20 positioned upright to receive supply of spherical bodies 16 dumped therein by a chute 22. The spherical bodies fall by gravity to the bottom of the wing structure and gradually build up in a random manner as illustrated in Fig. 2. Stringers 14 have apertures 15 of a greater diameter than the diameter of the spheres to permit access to and eliminate large voids in the various portions of the wing.

An important concept in this fabricating process is to be able to fill the wing structure in a quick, mass operation, as distinguished from the time-consuming task of handling the spheres on an individual tailored basis. However, in order to obtain a fabricated structural element, of a consistent and uniformly high strength without localized weak areas, the mass filling step should be associated with a mass orienting step to rearrange the relationship of the spheres with each other from a random disposition (Fig. 2) having voids to a uniform disposition (Fig. 3) wherein the spheres are equally spaced from each other and have a maximum number of points of contact, such as is illustrated in Fig. 4–6 inclusive, presently to be described.

Such uniform orientation can be obtained by mounting stand 18 on any suitable vibrating mechanism, such as offset eccentric drive arrangement 24. The wing can be vibrated during filling or after filling to achieve the uniform disposition of the spheres in Figs. 3–6 inclusive.

Figs. 4 and 5 illustrate the ultimate orientation of surrounding spherical bodies, each sphere, such as 16', being surrounded and contacting twelve different adjacent spheres. As seen from Fig. 4, this disposition comprises three upper spheres, three lower spheres, and six spheres therebetween. It is to be understood that although in some portions of the filling, i.e., area 25, depending on the size of the cavity and the sphere diameter, the orientation of the spheres may not be exactly as illustrated in Figs. 4 and 5, sufficient contact will exist to provide the structural strength required. While the judicious selection of the sphere diameter may minimize any non-uniformity in the orientation, it is possible in installations having irregular shapes that different diameter spheres may be employed for different portions of the structure.

As shown in Fig. 5, adjacent spherical bodies are in contact at areas 26, the extent of the contacting area depending on the spherical diameter. Spaces 28 existing between the spheres form a labyrinth of interconnected passageways for the storage of the flow of fluids. In structural elements adapted for use in supersonic missiles subjected to high temperature conditions, these passageways can be utilized to conduct a coolant fluid. It is to be noted that these passageways are between the spherical bodies, and not in the spherical bodies, which are independently sealed.

In order to secure the spherical bodies (Figs. 3-6) in this optimum configuration, which arrangement offers maximum rigidity and strength to the structural element, the spheres are bonded or otherwise secured together in a mass operation. This can be accomplished by initially electroplating a metallic coating 30 (Fig. 5) on the spheres prior to the filling operation. Following the filling and vibrating steps as heretofore described, the entire filled structure is heated to a temperature causing the metallic coating to fuse the spheres and skin together to form a rigid interstitial mass. As shown in Fig. 6, metallic coating 30 has melted and is drawn by capillary action to accumulate at the points of contact between the spheres, enlarging the area of contact therebetween and increasing the rigidity of the structure.

For this purpose and for weight consideration the spheres are preferably hollow and may be formed of two sheet metal hemispheres integrally joined and sealed together in a suitable manner. The type and the thickness of the spherical material, and the diameter of the spheres are variables which will have considerable bearing on the characteristics of the structural element and are factors which will enter into the design of each particular structure. Furthermore, the type of electroplating material must be chosen of a class having a melting point sufficiently above the environmental temperature of the structural element to avoid a de-fuzing action. Instead of electroplating the spheres, these parts can be fluxed and dipped in molten metal to accomplish a similar result. The bonding of the spheres could be accomplished in some applications by using adhesives of a non-metallic base, such as resinous or rubber base, and actually the spheres could be made of a structural plastic material.

It is apparent this invention provides a method of fabricating an interstitial structural element that is light weight, high strength and relatively low cost. The method is particularly suited for irregularity shaped hollow structural elements. The low cost is achieved primarily by using mass operations of filling, orienting and securing the spheres in the preferred arrangement within the structural element. This rigid interstitial arrangement of the filling permits the passage of a fluid if desired.

Obviously many modifications and variations of the present invention are possible in the light of the above teachings. It is therefore to be understood that within the scope of the appended claims the invention may be practiced otherwise than as specifically described.

I claim:
1. A filling for a structural element having a cavity comprising a plurality of substantially rigid spheres having the same diameter, said spheres being so oriented in a multi-layer mass as to make the maximum possible number of mutual contacts at a plurality of points about their peripheries, the spheres being integrally joined together at their points of mutual contacts to form a rigid interstitial mass having voids between the points of contact of the spheres.

2. A structural element having a cavity, a plurality of spheres having the same diameter disposed in said cavity and being so oriented in a multi-layer mass as to make the maximum possible number of mutual contacts at a plurality of points about their peripheries and the cavity wall, said spheres being fused together at their points of mutual contacts to form a rigid interstitial element having voids between the points of contact of the spheres.

3. A method of fabricating a hollow structure which comprises the steps of filling said structure with a plurality of loose, substantially rigid spheres having substantially the same diameter, orienting said spheres to assume a position within said hollow structure having a maximum number of mutual contacts with each other, and securing said spheres at their points of mutual contacts in said oriented position within the structure to form a rigid interstitial structure having voids between the points of contact of the spheres.

4. A method of fabricating a hollow structure which comprises the steps of randomly filling said structure with a plurality of loose, uniformly sized, substantially rigid spherical elements, vibrating said filled structure to orient said spheres from the random filled position to a position of maximum peripheral contact with surrounding spheres, and securing all of said spheres simultaneously in the oriented position at the points of contact to form a rigid interstitial structure having voids between the points of contact of the spheres.

5. A method of fabricating a hollow structure which comprises the steps of filling said structure with a plurality of loose, uniformly sized, substantially rigid spherical elements each having a fusible coating covering the entire surface, vibrating said filled structure to orient said spheres from a random position to a uniform position whereby maximum contact is obtained with surrounding spheres at a plurality of points about their peripheries, heating said filled structure to a temperature to fuse the coatings of the spheres together a their areas of contact, and cooling said structure to solidify said fused coatings to form a rigid interstitial structure having voids between the points of contact of the spheres.

6. An aerodynamic structural element being subjected to tensile forces comprising a thin outer metallic casing having a cavity, a plurality of hollow metallic spheres having the same diameter disposed within said cavity and benig so oriented in a multi-layer mass to make the maximum possible number of mutual contacts at a plurality of points about their periphery, said spheres being fused together and to the casing at their points of contact by a metallic fusible material that initially formed a coating around the outer surface of each sphere to form a rigid interstitial element having interconnected voids between the points of contact of the spheres forming a plurality of interconnected passageways.

References Cited in the file of this patent

UNITED STATES PATENTS

| | | |
|---|---|---|
| 720,053 | McKibben | Feb. 10, 1903 |
| 1,704,612 | Johnson | Mar. 5, 1929 |
| 2,602,614 | Cole | July 8, 1952 |
| 2,724,132 | Shoup et al. | Nov. 22, 1955 |

FOREIGN PATENTS

| | | |
|---|---|---|
| 726,510 | France | Mar. 7, 1932 |